United States Patent
Wagner et al.

(10) Patent No.: US 11,981,768 B2
(45) Date of Patent: May 14, 2024

(54) POLYOL COMPONENT AND USE THEREOF FOR PRODUCING RIGID POLYURETHANE FOAMS

(71) Applicant: BASF SE, Ludwigshafen am Rhein (DE)

(72) Inventors: Hendrik Wagner, Lemfoerde (DE); Man Fu Zhong, Shanghai (CN); Sirus Zarbakhsh, Ludwigshafen (DE)

(73) Assignee: BASF SE, Ludwigshafen am Rhein (DE)

( * ) Notice: Subject to any disclaimer, the term of this patent is extended or adjusted under 35 U.S.C. 154(b) by 163 days.

(21) Appl. No.: 17/439,693

(22) PCT Filed: Mar. 19, 2020

(86) PCT No.: PCT/EP2020/057638
§ 371 (c)(1),
(2) Date: Sep. 15, 2021

(87) PCT Pub. No.: WO2020/188039
PCT Pub. Date: Sep. 24, 2020

(65) Prior Publication Data
US 2022/0162372 A1  May 26, 2022

(30) Foreign Application Priority Data
Mar. 19, 2019  (WO) .................. PCT/IB2019/052212

(51) Int. Cl.
| | | |
|---|---|---|
| C08G 18/08 | (2006.01) |
| C08G 18/18 | (2006.01) |
| C08G 18/20 | (2006.01) |
| C08G 18/48 | (2006.01) |
| C08G 18/50 | (2006.01) |
| C08G 18/76 | (2006.01) |
| C08J 9/14  | (2006.01) |
| C08G 101/00 | (2006.01) |

(52) U.S. Cl.
CPC ........... *C08G 18/14* (2013.01); *C08G 18/482* (2013.01); *C08G 18/4829* (2013.01); *C08G 18/4841* (2013.01); *C08G 18/485* (2013.01); C08G 2101/00 (2013.01); C08G 2110/0025 (2021.01)

(58) Field of Classification Search
None
See application file for complete search history.

(56) References Cited

U.S. PATENT DOCUMENTS

| | | | |
|---|---|---|---|
| 4,342,842 A | 8/1982 | Hira et al. | |
| 9,062,158 B2 | 6/2015 | Gehringer et al. | |
| 2004/0143027 A1 | 7/2004 | Schilling et al. | |
| 2006/0142407 A1 | 6/2006 | Hollmann et al. | |
| 2007/0254973 A1 | 11/2007 | Emge et al. | |
| 2009/0062415 A1 | 3/2009 | Fukuba et al. | |
| 2012/0214891 A1 | 8/2012 | Gehringer et al. | |
| 2014/0010981 A1 | 1/2014 | Grieser-Schmitz et al. | |
| 2015/0133573 A1 | 5/2015 | Albers et al. | |
| 2016/0311962 A1* | 10/2016 | Kinoshita | C08G 18/4816 |
| 2018/0051121 A1* | 2/2018 | Micheletti | C08G 18/4879 |
| 2019/0284363 A1* | 9/2019 | Albers | B29C 45/0001 |
| 2020/0048400 A1 | 2/2020 | Zarbakhsh et al. | |

FOREIGN PATENT DOCUMENTS

| | | | | |
|---|---|---|---|---|
| CA | 2877942 A1 | 1/2014 | | |
| CN | 1102418 A | 5/1995 | | |
| CN | 101160333 A | 4/2008 | | |
| CN | 104093759 A | 10/2014 | | |
| DE | 10145458 A1 | 4/2003 | | |
| EP | 2115050 B1 | 9/2011 | | |
| EP | 2542612 A1 | 1/2013 | | |
| WO | WO-2007/146351 A2 | 12/2007 | | |
| WO | WO-2011/107367 A1 | 9/2011 | | |
| WO | WO-2018/093709 A1 | 5/2018 | | |
| WO | WO-2018099824 A1 * | 6/2018 | ......... | B29C 44/3403 |
| WO | WO-2018/177941 A1 | 10/2018 | | |

OTHER PUBLICATIONS

International Search Report for PCT Patent Application No. PCT/EP2020/057638, dated Jun. 3, 2020, 3 pages.
International Search Report for PCT Patent Application No. PCT/182019/052212, dated Dec. 20, 2019, 4 pages.
Mihail Ionescu, "Chapter 3: the General Characteristics of Oligo-Polyols", Chemistry and Technology of Polyols for Polyurethanes, Oct. 12, 2005, pp. 34-39.

* cited by examiner

*Primary Examiner* — Melissa A Rioja
(74) *Attorney, Agent, or Firm* — Grüneberg and Myers PLLC

(57) ABSTRACT

A polyol component P) contains at least three different polyether polyols A) to C). A method produces rigid polyurethane foams using the polyol component P), and the rigid polyurethane foams produced therefrom are useful.

20 Claims, No Drawings

POLYOL COMPONENT AND USE THEREOF FOR PRODUCING RIGID POLYURETHANE FOAMS

CROSS-REFERENCE TO RELATED APPLICATIONS

This application is the National Stage entry under § 371 of International Application No. PCT/EP2020/057638, filed on Mar. 19, 2020, and which claims the benefit of priority to IB Application No. PCT/IB2019/052212, filed on Mar. 19, 2019. The content of each of these applications is hereby incorporated by reference in its entirety.

BACKGROUND OF THE INVENTION

Field of the Invention

The invention relates to a polyol component P), to a method for producing rigid polyurethane foams using the polyol component P), and to rigid polyurethane foams produced with the polyol component P).

Description of Related Art

Rigid polyurethane (PU) foams can be produced in a known way by the reaction of organic polyisocyanates with one or more compounds having at least two isocyanate reactive groups, preferably polyether, polyester and/or polyether-ester alcohols (polyols), in the presence of blowing agents, catalysts, and optionally auxiliaries and/or adjuvants.

Rigid PU foams are frequently used for producing refrigeration equipment. The casings of the refrigeration equipment in this case are typically filled with the polyol-isocyanate mixture, and the rigid PU foam is formed in situ between the two covers constituting respectively the inner and outer facings of the refrigeration cabinet. To ensure the stability of the composite structure thus produced, the rigid PU foams has to show good adhesion to the inner and outer facing materials (e.g. metal, high-impact polystyrene, etc.). Important for a high throughput in the foaming step and hence for high productivity in the production of refrigerator, good demolding behavior is a very crucial property of the applied PU rigid foams. Such behavior is evident, for example, from as little post-expansion as possible of the freshly cured rigid PU foam. Moreover, the rigid PU foam is required to exhibit good heat insulation. There is a requirement for rigid PU foams whose properties in this combination are further improved by comparison with the rigid PU foams known from the prior art.

WO 2018/177941 A1 describes a polyol component for producing rigid PU foams, comprising a polyether polyol having a functionality of 5.7 to 6.4 and a hydroxyl number of 300 to 500 mg KOH/g, a polyether polyol having a functionality of 3.0 to 5.0 and a hydroxyl number of 300 to 500 mg KOH/g, and a polyether polyol having a functionality of 2.8 to 5.0 and a hydroxyl number of 100 to 290 mg KOH/g.

SUMMARY OF THE INVENTION

It is an object of the present invention to provide a polyol component which, relative to the polyol components known in the prior art, leads to further improvements in the rigid PU foams produced therefrom. The goal was to combine better demolding times with good adhesion properties and good heat insulation properties of the rigid PU foams prepared according to the present invention.

This object is achieved by means of a polyol component P) comprising:
- a) one or more polyether polyols A) having an OH number in the range from 300 to 520 mg KOH/g, selected from reaction products of monosaccharides, oligosaccharides, polysaccharides, polyhydric alcohols, alkoxylation products of the aforesaid compounds, or mixtures thereof with alkylene oxides;
- b) one or more polyether polyols B) with an OH number in the range from 320 to 500 mg KOH/g, selected from reaction products of aromatic diamines with alkylene oxides;
- c) one or more polyether polyols C) having an OH number in the range from 15 to 60 mg KOH/g, selected from reaction products of monosaccharides, oligosaccharides, polysaccharides, polyhydric alcohols, water or mixtures thereof with alkylene oxides;
- d) optionally one or more polyols D) which are different from the polyether polyols A), B) and C);
- e) optionally one or more catalysts E);
- f) optionally one or more further components F) selected from auxiliaries and adjuvants; and
- g) optionally one or more blowing agents G) selected from chemical blowing agents G1) and physical blowing agents G2).

The object is further achieved by a method for producing rigid polyurethane foams by reaction of
- I) di- or polyisocyanates PI) or mixtures thereof with
- II) a polyol component P).

The object is likewise achieved by a rigid polyurethane foam which is obtainable by the method of the invention and also by the use of the polyol component P) of the invention for producing rigid polyurethane foams.

The object is likewise achieved by the use of the polyurethane foam produced by the method of the invention for insulating and cooling applications.

Surprisingly the presence of the polyether polyol C) in the polyol component P) of the invention brings about a marked improvement in the adhesion properties of the rigid PU foams produced therewith, accompanied by achievement of good to improved demolding times and good to improved heat insulation on the part of the rigid PU foams. Polyether Polyols along the lines of polyether polyols C) conveniently could be obtained as recycling products from flexible foam applications, such as for example from used mattresses.

The invention is described with more precision hereinafter.

DETAILED DESCRIPTION OF THE INVENTION

The OH number (hydroxyl number) can be determined by commonplace methods. For example, the OH number may be determined in accordance with DIN 53240 (1971-12).

In the context of the present invention, the functionality of a polyol, especially that of the polyether polyols A), B), C) and of the polyols D) for use in accordance with the invention, denotes the number of hydrogen atoms per mole of starter compound or per mole of mixture of the starter compounds, that are reactive with alkylene oxide before the time of the alkylene oxide feed. This time of the alkylene oxide feed is the start of the adding of the alkylene oxide component to the starter compound(s). The computation takes account of all the alkylene oxide-reactive hydrogen atoms that are present in the starter mixture and are atoms of the starter compound(s).

The functionality F within the meaning of the present invention is computed by the following formula (I):

$$F = \frac{\sum_{i=1}^{m} n_i \cdot f_i}{\sum_{i=1}^{m} n_i} \quad (I)$$

$n_i$=mol of starter i
$f_i$=functionality of starter i
m=number of starters in the starter mixture
F=functionality The functionality F of a polyol prepared from a mixture of two starter compounds (m=2) is computed as follows:

F=(mol of starter compound A*functionality of starter compound A+mol of starter compound B*functionality of starter compound B)/(mol of starter A+mol of starter B).

In the case of further starter molecules, the formula is supplemented accordingly. Thus, for example, a polyether polyol has a functionality of 5.12 if 626.48 mol of glycerol (functionality 3), 559.74 mol of sucrose (functionality 8) and 67.31 mol of dimethylethanolamine (functionality 1) are used.

The functionality F determined by the formula presented above is also called equivalent functionality and is known to the skilled person as a readily accessible method for determining the functionality of polyols; see M. Ionescu "Chemistry and Technology of Polyols for Polyurethanes", 2005 Rapra Technology Limited, pages 34 to 39.

The functionality defined above in accordance with the invention for the polyether polyols A), B), C) and D) may differ from the functionality after the start of the addition of at least one alkylene oxide, i.e., during the reaction of the at least one alkylene oxide with a starter compound, or of the reaction product, owing to the formation during the reaction of byproducts such as glycols and unsaturated monofunctional constituents. Such secondary reactions are known from the literature. The functionality of the polyether polyols A), B), C) and of the polyols D) may therefore also be referred to as the functionality of the starter or starter mixture used for preparing the polyol in question.

In accordance with the functionality definition given above, for example, "polyether polyol having a functionality in the range from 4.6 to 6.5, selected from reaction products of monosaccharides, oligosaccharides, polysaccharides, polyhydric alcohols, alkoxylation products of the aforesaid compounds or mixtures thereof with alkylene oxides" means that the monosaccharides, oligosaccharides, polysaccharides, polyhydric alcohols, alkoxylation products of the aforesaid compounds or mixtures thereof that are used for the reaction with the alkylene oxides have an equivalent functionality of 4.6 to 6.5 in accordance with formula (I).

A polyether polyol in the sense of the present invention is an organic compound having at least ether groups and OH groups as functional groups. The polyether polyol customarily has 2 to 20 OH groups, preferably 2 to 10 OH groups, more preferably 2 to 8 OH groups.

Within the meaning of the present invention, the limits of the specified ranges are preferably included. Therefore, for example, the range from 5.2 to 6.4 includes the values 5.2 and 6.4.

The respective polyether polyols A), B), C) and polyol D) are different from one another in accordance with the present invention.

The polyether polyols A), B), C) and polyols D) are selected from reaction products of different starters with alkylene oxides. Suitable alkylene oxides are selected, for example, from $C_2$-$C_4$ alkylene oxides. These comprise ethylene oxide, propylene oxide, 1,2- and 2,3-butylene oxide and mixtures thereof. Particularly preferred are propylene oxide, ethylene oxide and mixtures thereof. The alkylene oxides may be used individually, alternatingly in succession and/or as mixtures.

Polyether Polyol A)

The polyol component P) comprises one or more polyether polyols A) having an OH number in the range from 300 to 520 mg KOH/g, preferably in the range from 390 to 520 mg KOH/g.

The polyether polyols A) are selected from reaction products of monosaccharides, oligosaccharides, polysaccharides, polyhydric alcohols, alkoxylation products of the aforesaid compounds or mixtures thereof with alkylene oxides. The monosaccharides, oligosaccharides, polysaccharides, polyhydric alcohols and also the alkoxylation products of the aforesaid compounds that are used in accordance with the invention comprise at least two alkylene oxide-reactive OH groups and in the context of the present invention are also referred to as starter compound $S^{4)}$ or starter $S^{4)}$. The starter compound encompasses the concepts of starter compound and starter compounds. In the reaction with the alkylene oxides, the alkylene oxides are added onto the starter compound(s), generally with use of a catalyst. This reaction is known per se to the skilled person.

The polyhydric alcohols used as starter compounds $S^{4)}$ for the polyether polyols A) are preferably organic compounds having 2 to 20 OH groups, more preferably 2 to 10 OH groups and very preferably having 3 to 8 OH groups. They are preferably selected from monomers, dimers and trimers. The molecular weight is preferably up to 400 g/mol, more preferably up to 300 g/mol, and very preferably up to 200 g/mol. Examples of the polyhydric alcohols used as starter compounds are sugar alcohols such as sorbitol and mannitol, the monomeric polyhydric alcohols ethylene glycol, propylene glycol, glycerol, trimethylolpropane and pentaerythritol, the dimeric polyhydric alcohols diethylene glycol and dipropylene glycol and also the trimeric polyhydric alcohol triethylene glycol.

Examples of monosaccharides, oligosaccharides and polysaccharides used in accordance with the invention are glucose and sucrose.

As starter compounds $S^{4)}$ it is also possible to use alkoxylation products of the recited monosaccharides, oligosaccharides, polysaccharides, polyhydric alcohols or mixtures thereof. The term "mixtures thereof" in this context denotes mixtures of at least two different starter compounds selected from the stated monosaccharides, oligosaccharides, polysaccharides and polyhydric alcohols. Examples of such mixtures are mixtures of two different polyhydric alcohols such as glycerol and sorbitol and mixtures of a polyhydric alcohol and a monosaccharide such as glycerol and sucrose, and mixtures of glycerol, ethylene glycol and sucrose.

The monosaccharides, oligosaccharides, polysaccharides, polyhydric alcohols or mixtures thereof are reacted as described above with alkylene oxides to give the alkoxylation products, the alkoxylation products customarily being prepared with $C_2$-$C_4$ alkylene oxides, preferably with ethylene oxide and/or propylene oxide. The alkoxylation products are in that case reacted further as starter compound $S^{4)}$, in the preparation of the polyether polyols (A), with alkylene oxides. The use of the alkoxylation products as starter compounds $S^{4)}$ is especially advantageous if further starter compounds $S^{4)}$ are used which initially are present in solid form or have a high viscosity, as described later on below.

Preference is given to using sorbitol, mannitol, glycerol, trimethylolpropane, pentaerythritol, sucrose and mixtures thereof as starter compounds $S^{4)}$, and also mixtures of one or more compounds selected from sorbitol, mannitol, glycerol, trimethylolpropane, pentaerythritol and sucrose and one or more further polyhydric alcohols selected from ethylene glycol, propylene glycol, diethylene glycol, dipropylene glycol and triethylene glycol. Dipropylene glycol in the sense of the present invention embraces 2,2'-oxydi-1-propanol, 1,1'-oxydi-2-propanol and 2-(2-hydroxypropoxy)-1-propanol.

The starter compounds for the polyether polyols A) are preferably selected such that the functionality of component $S^{4)}$ is 4.6 to 6.5, more preferably from 4.8 to 6.5, very preferably from 5.2 to 6.5, and especially preferably from 5.7 to 6.5.

Particularly preferred for use as starter compounds $S^{4)}$ are mixtures of sucrose and at least one compound selected from glycerol, diethylene glycol and dipropylene glycol. Especially preferred is a mixture of sucrose and glycerol.

The polyether polyols A) are preferably selected from the reaction products of
  10 to 60 wt % of at least one starter compound $S^{4)}$ and
  40 to 90 wt % of at least one alkylene oxide,
  based on the total weight of the polyether polyol A) plus any catalyst used.

The fraction of the starter compounds $S^{4)}$ in the polyether polyols A) used in accordance with the invention is preferably 20 to 45 wt %, more preferably 25 to 42 wt %, very preferably 30 to 40 wt %, especially preferably 33 to 38 wt %, based on the weight of the polyether polyol A).

With particular preference the polyether polyols A) are selected from the reaction products of
  ai) 5 to 55 wt % of at least one starter compound $S^{4)}$ selected from glucose, mannitol, sucrose, pentaerythritol, trimethylolpropane and sorbitol,
  aii) 5 to 55 wt % of at least one non-ai) starter compound $S^{4)}$, preferably selected from glycerol, monopropylene glycol, diethylene glycol, triethylene glycol, dipropylene glycol, alkoxylation products of the aforesaid compounds and alkoxylation products of glucose, mannitol, sucrose, pentaerythritol, trimethylolpropane and/or sorbitol or mixtures thereof,
  aiii) 40 to 90 wt % of at least one alkylene oxide, preferably selected from propylene oxide and ethylene oxide,
where the sum of ai), aii) and/or aiii) makes 100 wt %, plus any catalyst used such as imidazole.

The catalyst is optionally used in addition to components ai), aii), aiii).

Catalysts used for the reaction of the starter compound(s) $S^{4)}$ with alkylene oxide(s) are usually basic compounds. In the case of the industrial processes, the compounds in question are usually the hydroxides of alkali metals, such as sodium, cesium or, in particular, potassium hydroxide, for example. Alkali metal alkoxides as well, such as sodium methoxide, sodium or potassium ethoxide or potassium isopropoxide, for example, are known catalysts. The preparation may likewise take place with amine catalysis.

The amine catalysts are preferably selected from the group containing trialkylamines such as, for example, trimethylamine, triethylamine, tripropylamine and tributylamine; dimethylalkyl-amines such as, for example, dimethylethanolamine, dimethylcyclohexylamine, dimethylethylamine and dimethylbutylamine; aromatic amines such as, for example, dimethylaniline, dimethylaminopyridine, dimethylbenzylamine, pyridine, imidazoles such as, for example, imidazole, 4(5)-methylimidazole, 3-methylimidazole and 1-hydroxypropylimidazole; guanidines and amidines such as, for example, 1,5-diazabicyclo[4.3.0]non-5-ene and 1,5-diazabicyclo[5.4.0]undec-7-ene. Preferably the catalyst is dimethylethanolamine. Very preferably the catalyst is an imidazole.

The alkylene oxide addition reaction is carried out preferably at a temperature between 90 and 150° C. under a pressure of between 0.1 to 8 bar. The feed of the alkylene oxides is typically followed by a post-reaction phase within which the alkylene oxide is consumed by reaction. This may be followed, where necessary, by a post-reaction phase. Distillation normally follows for the purpose of removing volatile constituents, preferably under reduced pressure.

Particularly when using solid starter compounds, such as sucrose, for preparing the polyether polyol A) of the invention, the feed rates at the start of the operation are necessarily slow, since the alkylene oxide dissolves poorly in the reaction mixture and leads to slow reaction rates. Moreover, the high viscosity developed in the starter mixture when using solid starter compounds means that removal of heat is relatively poor. This may result in local instances of overheating, which is detrimental to product quality. Moreover, the high viscosity accelerates the wear of pumps and heat exchangers. Adding at least one further polyol to the starter mixture allows the adverse effects to be diminished. This is described in EP 2542612, for example. In some of the experiments described, therefore, the mixtures of the starter compounds were admixed with polyetherols in order to reduce the viscosity of the starting mixture and to permit an improved operational regime.

In the preparation of the polyetherols A) it is preferred, for viscosity lowering, to add alkoxylation products of monosaccharides, oligosaccharides, polysaccharides, polyhydric alcohols or mixtures thereof. Particularly preferred are a propoxide prepared starting from sucrose/glycerol and having a molar mass of 488 g/mol, an OH number of 490 mg mg KOH/g and a functionality of 4.3, and also a propoxide prepared starting from sucrose/glycerol and having a molar weight of 639 g/mol and a functionality of 5.1. The primary purpose of using the alkoxylation products as further starter compound $S^{4)}$ is that of simplifying the operational regime.

In computing the functionality of the polyether polyol A) of the invention, the abovementioned alkoxylation products are considered accordingly.

The polyether polyols A) preferably have functionalities in the range from 4.6 to 6.5, more preferably from 4.8 to 6.5, very preferably from 5.2 to 6.5 and especially preferably from 5.7 to 6.5. The use of polyether polyols A) with relatively high functionalities improves the demolding during the production of the rigid PU foams.

In another preferred embodiment, the polyether polyol A) has a functionality in the range from 4.8 to 6.5 and an OH number in the range from 300 to 520 mg KOH/g, more particularly a functionality in the range from 5.2 to 6.5 and an OH number in the range from 390 to 520 mg KOH/g.

Generally speaking, the fraction of the polyether polyols A) is 35 to 70 wt %, preferably 37 to 55 wt %, more preferably 40 to 60 wt %, based on the total amount of components A) to G1) of the polyol component P).

Polyether Polyols B)

The polyol component P) comprises one or more polyether polyols B) having an OH number in the range from 320 to 500 mg KOH/g, preferably in the range from 380 to 450 mg KOH/g.

The polyether polyol B) preferably has a functionality in the range from 3.0 to 4.0, more preferably a functionality in the range from 3.5 to 4.0, very preferably a functionality in the range from 3.8 to 4.0.

The polyether polyols B) are selected from the reaction products of aromatic diamines with alkylene oxides. The aromatic diamines are also referred to as starter compound or starter compounds $S^{B)}$.

Examples of the aromatic diamines used as starter compounds $S^{B)}$ are tolylenediamines (TDA) and methylenedianilines (MDA). Preferred starter compounds $S^{B)}$ are tolylenediamines (TDA). Tolylenediamines encompass 2,3-, 3,4-, 2,4-, 2,5-, and 2,6-tolylenediamine. 2,3- and 3,4-tolylenediamine are also referred to as vicinal TDA. The tolylenediamine isomers may be used individually or in mixtures, as for example as mixtures of 2,4-TDA and 2,6-TDA, as mixtures of 3,4-TDA and 2,3-TDA, or as mixtures of 2,4-TDA, 2,6-TDA, 3,4-TDA and 2,3-TDA. Particularly preferred are mixtures of tolylenediamines having a vicinal tolylenediamine content of at least 75 wt %, preferably at least 80 wt %, more preferably at least 85 wt %, and more particularly at least 90 wt %, for use, based in each case on the total weight of the mixtures.

The aromatic diamines used as starter compounds $S^{B)}$ for the polyether polyols B) used in accordance with the invention are preferably selected such that their functionality is 3.0 to 4.0, more preferably 3.5 to 4.0 and very preferably 3.8 to 4.0. A mixture of suitable starter molecules is optionally used.

The polyether polyols B) are preferably selected from the reaction products of 2,3-, 3,4-, 2,4-, 2,5-, 2,6-tolylenediamine or mixtures thereof with $C_2$-$C_4$ alkylene oxides, and especially preferred are polyether polyols B) selected from the reaction products of mixtures of tolylenediamines containing at least 75 wt %, more preferably at least 80 wt %, very preferably at least 85 wt %, and more particularly at least 90 wt %, of vicinal TDA, based on the tolylenediamine mixture, with $C_2$-$C_3$ alkylene oxides.

In general, the fraction of the polyether polyols B) is 5 to 50 wt %, preferably 8 to 45 wt %, more preferably 10 to 40 wt %, based on the total amount of components A) to G1) of the polyol component P).

Polyether Polyols C)

The polyol component P) comprises one or more polyether polyols C) having an OH number in the range from 15 to 75 mg KOH/g, preferably of 25 to 65 mg KOH/g, more preferably of 30 to 60 mg KOH/g.

The polyether polyol C) preferably has a functionality in the range from 1.9 to 5.5, more preferably of 2.0 to 5.0, more preferably still a functionality in the range from 2.3 to 5.0, more preferably of 2.5 to 4.5 and especially preferably a functionality of 2.8 to 4.0. Polyether polyol C) may also have a functionality in the range from 2.3 to 5.5.

Polyether polyol C) is selected from reaction products of monosaccharides, oligosaccharides, polysaccharides, polyhydric alcohols, water or mixtures thereof with alkylene oxides, preferably $C_2$-$C_4$ alkylene oxides, and more preferably from the reaction products with ethylene oxide, propylene oxide and/or mixtures thereof, very preferably from reaction products with ethylene oxide and propylene oxide.

The monosaccharides, oligosaccharides, polysaccharides, polyhydric alcohols, water and mixtures thereof that are used as starter compounds $S^{C)}$ for the polyether polyols C) used in accordance with the invention are generally selected such that their functionality is preferably 1.9 to 5.5, more preferably 2.0 to 5.0, more preferably still 2.3 to 5.0, very preferably from 2.5 to 4.5 and especially preferably 2.8 to 4.0. The functionality of starter compounds $S^{C)}$ for the polyether polyols C) may also be in the range from 2.3 to 5.5. A mixture of suitable starter molecules is optionally used.

Starter compounds $S^{C)}$ contemplated for the polyether polyols C) include the monosaccharides, oligosaccharides, polysaccharides, polyhydric alcohols, and also water and mixtures thereof, described for the polyether polyols A). Preferably the starter compounds $S^{C)}$ are selected from glycerol, trimethylolpropane, ethylene glycol, diethylene glycol, triethylene glycol, propylene glycol, dipropylene glycol, pentaerythritol, sorbitol, sucrose, water and mixtures thereof.

According to a further embodiment, the polyether polyol C) comprises one or more reaction products of polyhydric alcohols selected from glycerol, trimethylolpropane, ethylene glycol, diethylene glycol, triethylene glycol, propylene glycol, dipropylene glycol, pentaerythritol, sorbitol, sucrose, water and mixtures thereof with alkylene oxides, preferably with $C_2$-$C_4$ alkylene oxides, more preferably from the reaction products with ethylene oxide, propylene oxide and/or mixtures thereof, and especially preferably the polyether polyol C) is selected from the aforesaid reaction products.

The alkylene oxides used for preparing the polyether polyols C) correspond to the alkylene oxides described earlier on above. The alkylene oxides are preferably selected from $C_2$-$C_4$ alkylene oxides, more preferably from ethylene oxide, propylene oxide and mixtures thereof. The reaction may take place in each case with an alkylene oxide or with a mixture of alkylene oxides; it is also possible in succession to use different alkylene oxides or mixtures of alkylene oxides, so that the polyether polyol comprises alkylene oxide chains composed of alkylene oxide blocks with different compositions. The starter compounds $S^{C)}$ are preferably reacted in succession in various orders with propylene oxide, ethylene oxide and/or mixtures of ethlene oxide and propylene oxide, so that the ethylene oxide and propylene oxide units form pure ethylene oxide blocks, pure propylene oxide blocks and/or mixed blocks of ethylene oxide and propylene oxide. It is especially preferred here if the starter compound $S^{C)}$ is reacted first with propylene oxide and subsequently with ethylene oxide or with a mixture of ethylene oxide and propylene oxide, so that the polyether polyol C) is composed of starter compound $S^{C)}$ and alkylene oxide chains formed of at least one propylene oxide block and a terminal ethylene oxide block or propylene-co-ethylene oxide block.

According to one embodiment, the polyether polyol C) comprises 5 to 35 wt % of ethylene oxide units, preferably 10 to 25 wt % of ethylene oxide units and more preferably 11 to 18 wt % of ethylene oxide units, based on the total weight of the polyether polyol C). The presence of such these ethylene oxide units usually helps to improve the overall miscibility and/or compatibility of the polyol component P). It is particularly preferred here if the polyether polyols C) are selected from reaction products of the starter compounds $S^{C)}$ with ethylene oxide, propylene oxide and mixtures thereof.

Preferred polyether polyols C) are those having the following structure:

where
S is selected from monosaccharides, oligosaccharides, polysaccharides, water and polyhydric alcohols, as described above;
n is 2 to 10, preferably 2 to 8; and
B in each case independently of one another at each occurrence is a chain composed of ethylene oxide and propylene oxide units, where the ethylene oxide and the propylene oxide units form pure ethylene oxide blocks, pure propylene oxide blocks and/or mixed blocks of ethylene oxide and propylene oxide and the terminal block comprises 10 to 100 wt % of ethylene oxide units, preferably 15 to 100 wt % and more preferably 20 to 100 wt % of ethylene oxide units, based on the total weight of the terminal block.

The term "terminal block" customarily denotes the terminal alkylene oxide sequence which was formed in the last alkoxylation step during the preparation of the polyether polyol, in other words the sequence formed by the last addition of an alkylene oxide or alkylene oxide mixture.

The concentration of the polyether polyol C) is preferably at least 1.5 wt %, based on the total amount of components A) to G1) of the polyol component P). Customarily the polyol component P) comprises not more than 30 wt % of polyether polyol C), and preferably the polyol component P) comprises 2 to 25 wt %, more preferably 2.5 to 20 wt %, of polyether polyol C), based on the total amount of components A) to G1) of the polyol component P).

Polyols D)

The polyol component P) may further comprise one or more polyols D) which are different from the polyether polyols A), B) and C). These polyols D) are customarily selected from the polyols known to the skilled person for the preparation of polyurethanes.

The further polyol D) is preferably selected from polyether polyols D1) having an OH number in the range from 100 to 240 mg KOH/g, preferably of 120 to 220 mg KOH/g, more preferably of 140 to 200 mg KOH/g, which are selected from reaction products of amines, polyhydric alcohols or mixtures thereof with alkylene oxides.

The at least one polyether polyol D1) preferably has a functionality in the range from 2.8 to 5.0, more preferably a functionality in the range from 3.1 to 5.0, more preferably still from 3.5 to 4.5, and very preferably a functionality of 3.5 to 4.0.

According to one embodiment of the invention, the functionality is in the range from 3.0 to 5.0, or 3.1 to 5.0.

According to a further embodiment of the invention, the functionality is therefore in the range from 2.8 to 3.0, or 2.8 to below 3.0.

Polyether polyol D1) is selected from reaction products of amines, polyhydric alcohols or mixtures thereof with alkylene oxides.

The amines, polyhydric alcohols and mixtures thereof that are used as starter compounds $S^{D1)}$ for the polyether polyols D1) used in accordance with the invention are generally selected such that their functionality is 2.8 to 5.0, preferably 3.1 to 5.0, more preferably from 3.5 to 4.5 and very preferably 3.5 to 4.0. A mixture of suitable starter molecules is optionally used.

Examples of starter compounds $S^{D1)}$ contemplated for the polyether polyols D1) include aliphatic and aromatic diamines such as ethylenediamine, 1,3-propylenediamine, 1,3- and/or 1,4-butylenediamine, 1,2-, 1,3-, 1,4-, 1,5- and 1,6-hexamethylenediamine, phenylenediamines, 2,3-, 3,4-, 2,4-, 2,5- and 2,6-tolylenediamine and 4,4'-, 2,4'- and 2,2'-diaminodiphenylmethane.

Particularly preferred are the aforementioned primary diamines, especially mixtures of the aforementioned primary amines which comprise vicinal TDA (vic-TDA).

Also contemplated as starter compounds $S^{D1)}$ for polyether polyol D1) are polyhydric alcohols as described above for polyether polyol A). The polyhydric alcohols are preferably selected from the group consisting of glycerol, trimethylolpropane, monopropylene glycol, diethylene glycol, triethylene glycol, dipropylene glycol and mixtures thereof. Glycerol is especially preferred.

According to one embodiment, the polyether polyol D1) comprises one or more reaction products of amines selected from ethylenediamine, 1,3-propylenediamine, 1,3-, 1,4-butylenediamine, 1,2-, 1,3-, 1,4-, 1,5-, 1,6-hexamethylenediamine, phenylenediamines, 2,3-, 3,4-, 2,4-, 2,5-, 2,6-tolylenediamine and 4,4'-, 2,4'-, 2,2'-diaminodiphenylmethane and mixtures thereof with alkylene oxides, the polyether polyol D1) preferably being selected from the aforesaid reaction products.

According to another embodiment, the polyether polyol D1) comprises one or more reaction products of polyhydric alcohols selected from glycerol, trimethylolpropane, monopropylene glycol, diethylene glycol, triethylene glycol and mixtures thereof with alkylene oxides, and preferably the polyether polyol D1) is selected from the aforesaid reaction products.

The alkylene oxides used for preparing the polyetherols D1) correspond to the alkylene oxides described earlier on above. The polyether polyols D1) preferably comprise ethylene oxide and propylene oxide units, and more preferably the polyetherols D1) are selected from reaction products of amines, polyhydric alcohols or mixtures thereof with ethylene oxide and propylene oxide, and especially preferably the polyetherols D1) are selected from the reaction products of ethylenediamine, 1,3-propylenediamine, 1,3-, 1,4-butylenediamine, 1,2-, 1,3-, 1,4-, 1,5-, 1,6-hexamethylenediamine, phenylenediamines, 2,3-, 3,4-, 2,4-, 2,5-, 2,6-tolylenediamine and 4,4'-, 2,4'-, 2,2'-diaminodiphenylmethane, glycerol, trimethylolpropane, monopropylene glycol, diethylene glycol, triethylene glycol, dipropylene glycol or mixtures thereof with ethylene oxide and propylene oxide.

Polyether polyols B) and D1) used in accordance with the invention may be prepared by known methods, as for example by anionic polymerization with alkali metal hydroxides, such as sodium or potassium hydroxide, or alkali metal alkoxides, such as sodium methoxide, sodium or potassium ethoxide or potassium isopropoxide, for example, as catalysts, or by cationic polymerization with Lewis acids, such as antimony pentachloride, boron fluoride-etherate, etc., or bleaching earth, as catalysts composed of one or more alkylene oxides having 2 to 4 carbon atoms in the alkylene radical. The preparation may likewise take place with imidazole catalysis or using trimethylamine or N,N-dimethylcyclohexylamine.

The fraction of the polyols D) in the polyol component P) is customarily 0 to 40 wt %, based on the total amount of components A) to G1) of the polyol component P), preferably >0 to 40 wt %, more preferably 1 to 30 wt %, very preferably 2 to 25 wt %, based on the total amount of components A) to G1) of the polyol component P).

If the polyol component P) comprises one or more polyether polyols D1), the total concentration of the polyether polyols C) and D1) is preferably at least 5 wt %, based on the total amount of components A) to G1) of the polyol component P).

Catalysts E)

The polyol component P) of the invention may comprise at least one catalyst E).

Catalysts E) used are, in particular, compounds which strongly accelerate the reaction of the polyether polyols A), B) and C) and also, optionally, D) present in the polyol component P) with the organic, optionally modified di- and/or polyisocyanates PI in accordance with the process of the invention hereinafter.

Usefully as catalysts E) it is possible to use basic polyurethane catalysts, examples being tertiary amines, such as triethylamine, tributylamine, dimethylbenzylamine, dicyclohexylmethylamine, dimethylcyclohexylamine, bis(2-dimethylaminoethyl) ether, bis(dimethylaminopropyl)urea, N-methyl- and/or N-ethylmorpholine, N-cyclohexylmorpholine, N,N,N',N'-tetramethylethylenediamine, N,N,N,N-tetramethylbutanediamine, N,N,N,N-tetra-methylhexane-1, 6-diamine, pentamethyldiethylenetriamine, dimethylpiperazine, N-dimethyl-aminoethylpiperidine, 1,2-dimethylimidazole, 1-azabicyclo[2.2.0]octane, 1,4-diazabicyclo[2.2.2]-octane (Dabco), 1,8-diazabicyclo[5.4.0]undec-7-ene, and alkanolamine compounds, such as triethanolamine, triisopropanolamine, N-methyl- and N-ethyldiethanolamine, dimethylaminoethanol, 2-(N,N-dimethylaminoethoxy)ethanol, N,N',N''-tris-(dialkylaminoalkyl) hexahydrotriazines, e.g., N,N',N''-tris (dimethylaminopropyl)-s-hexahydrotriazine, and triethylenediamine. Also suitable, however, are metal salts, such as iron(II) chloride, zinc chloride, lead octoate, and preferably tin salts, such as tin dioctoate, tin diethylhexoate and dibutyltin dilaurate.

The following catalysts E) are further contemplated: amidines, such as 2,3-dimethyl-3,4,5,6-tetrahydropyrimidine, tetraalkylammonium hydroxides, such as tetramethylammonium hydroxide, alkali metal hydroxides, such as sodium hydroxide, and alkali metal alkoxides, such as sodium methoxide and potassium isopropoxide, and also alkali metal salts of acids, especially long-chain fatty acids having 10 to 20 carbon atoms and optionally pendant OH groups.

Preference is given to using a mixture of two or more of the aforesaid catalysts E). Particular preference is given to the use of a catalyst mixture E) consisting of the following: dimethylcyclohexylamine E1), pentamethyldiethylenetriamine or bis(2-dimethylaminoethyl) ether E2), tris(dimethylaminopropyl)hexahydro-1,3,5-triazine E3) and dimethylbenzylamine E4).

In the aforesaid catalyst mixture the catalysts E1) to E4) are used, the fraction of the catalyst E1) is preferably 20 to 60 wt %, the fraction of the catalyst E2) is preferably 10 to 50 wt %, the fraction of the catalyst E3) is preferably 10 to 40 wt % and the fraction of the catalyst E4) is preferably 20 to 50 wt %, with the sum of the catalysts E1) to E4) making 100 wt %.

Preference is given to using 1.0 to 5.5 wt %, more particularly 1.0 to 5.0 wt %, of one or more catalysts E), based on the total amount of components A) to G1) of the polyol component P).

Where a relatively large excess of polyisocyanate is used when foaming, catalysts contemplated for the trimerization reaction of the excess NCO groups with one another further include the following: catalysts forming isocyanurate groups, examples being ammonium ion salts or alkali metal salts, alone or in combination with tertiary amines.

Further information on the stated catalysts may be found in the technical literature, as for example the Kunststoffhandbuch, volume VII, Polyurethane, Carl Hanser Verlag Munich, Vienna, 1st, 2nd and 3rd editions of 1966, 1983 and 1993.

Component F)

The polyol component P) of the invention may comprise one or more further components F) selected from auxiliaries and adjuvants.

Auxiliaries and adjuvants F) of the polyol component P) are, for example, surface-active substances such as emulsifiers, foam stabilizers and cell regulators.

Examples of surface-active substances contemplated include compounds which serve to support the homogenization of the starting materials and that optionally are also suitable for regulating the cell structure of the plastics. Examples would include emulsifiers, such as the sodium salts of castor oil sulfates or of fatty acids, and also salts of fatty acids with amines, e.g., diethylamine oleate, diethanolamine stearate, diethanolamine ricinoleate, salts of sulfonic acids, e.g., alkali metal or ammonium salts of dodecylbenzene- or dinaphthylmethanedisulfonic acid and ricinoleic acid; foam stabilizers, such as siloxane-oxyalkylene copolymers and other organopolysiloxanes, ethoxylated alkylphenols, ethoxylated fatty alcohols, paraffin oils, castor oil esters or ricinoleic esters, turkey red oil and peanut oil; and cell regulators, such as paraffins, fatty alcohols and dimethylpolysiloxanes. Silicone stabilizers are particularly preferred.

The polyol component P) preferably comprises, as further component F), one or more foam stabilizers, especially silicone-containing foam stabilizers such as siloxane-oxyalkylene copolymers and other organopolysiloxanes.

The aforesaid foam stabilizers are used preferably in amounts of 0.5 to 4.5 wt %, more preferably 1 to 3.5 wt %, based on the weight of the polyol component P).

Further particulars regarding the aforementioned and other suitable auxiliaries and adjuvants are to be found in the technical literature, as for example in the monograph by J. H. Saunders and K. C. Frisch "High Polymers" volume XVI, Polyurethanes, parts 1 and 2, Interscience Publishers 1962 and 1964, or the Kunststoff-Handbuch, Polyurethane, volume VII, Hanser-Verlag, Munich, Vienna, 1st and 2nd editions, 1966 and 1983.

Blowing Agents G)

The polyol component P) may further comprise one or more blowing agents G) selected from chemical blowing agents G1) and physical blowing agents G2). The polyol component P) preferably comprises at least one blowing agent selected from chemical blowing agents G1) and physical blowing agents G2), and more preferably the polyol component P) comprises at least one chemical blowing agent G1) and at least one physical blowing agent G2).

The polyol component P) of the invention preferably comprises 1 to 20.0 wt %, more preferably 1.2 to 5.0 wt %, very preferably 1.5 to 3.0 wt % of a chemical blowing agent G1), based on the total amount of components A) to G1).

The polyol component P) of the invention preferably comprises 1 to 40.0 wt %, more preferably 3 to 30.0 wt %, very preferably 9.0 to 17.0 wt % of a physical blowing agent G2), based on the total amount of components A) to G1). Preference is given to using hydrocarbons, and with particular preference acyclic pentane isomers and/or cyclopentane, or mixtures thereof.

According to one embodiment, the polyol component P) of the invention comprises at least one chemical blowing agent G1) and at least one physical blowing agent G2) in the concentration ranges stated above.

Suitable physical blowing agents G2) that may be used are in general all hydrocarbons known as blowing agents to the skilled person, examples being non-halogenated and halogenated, preferably fluorinated, alkenes.

According to one embodiment, $C_2$ to $C_6$ fluoroalkenes are used, more preferably $C_3$ to $C_5$ fluoroalkenes.

Particularly preferred examples of fluorinated alkenes suitable in accordance with the invention are propenes, butenes, pentenes and hexenes having 3 to 6 fluoro substituents, where other substituents such as chloro may be present—for example, tetrafluoropropenes, fluorochloro-propenes, as for example trifluoromonochloropropenes, pentafluoropropenes, fluorochloro-butenes, hexafluorobutenes or mixtures thereof.

Fluorinated alkenes particularly preferred in accordance with the invention are selected from the group consisting of cis- or trans-1,1,1,3-tetrafluoropropene, 1,1,1-trifluoro-2-chloropropene, 1-chloro-3,3,3-trifluoropropene, 1,1,1,2,3-pentafluoropropene, in cis- or trans-form, 1,1,1,4,4,4-hexafluorobutene, 1-bromopentafluoropropene, 2-bromopentafluoropropene, 3-bromopentafluoropropene, 1,1,2,3,3,4,4-heptafluoro-1-butene, 3,3,4,4,5,5,5-heptafluoro-1-pentene, 1-bromo-2,3,3,3-tetrafluoropropene, 2-bromo-1,3,3,3-tetrafluoropropene, 3-bromo-1,1,3,3-tetrafluoropropene, 2-bromo-3,3,3-trifluoropropene, E-1-bromo-3,3,3-trifluoropropene, 3,3,3-trifluoro-2-(trifluoromethyl)propene, 1-chloro-3,3,3-trifluoropropene, 2-chloro-3,3,3-trifluoropropene, 1,1,1-trifluoro-2-butene and mixtures thereof.

According to a further embodiment, no halogenated hydrocarbons are used as physical blowing agents G2).

Preferred for use as physical blowing agents G2) are acyclic pentane isomers and/or cyclopentane, especially cyclopentane. Preference is given to using acyclic pentane isomers and/or cyclopentane in the range from 9 to 17 wt %, based on the total amount of components A) to G1). Cyclopentane and mixtures of isopentane with cyclopentane, having a cyclopentane content of at least 70 wt %, are preferred, and cyclopentane with a purity of at least 90 wt %, more particularly of at least 95 wt %, is particularly preferred, for use.

Chemical blowing agent G1) used is preferably water. The water with particular preference is used in a concentration of 1.5 to 3 wt %, based on the total amount of components A) to G1).

The polyol component P) preferably comprises:
a) 35 to 70 wt % of one or more polyether polyols A);
b) 5 to 50 wt % of one or more polyether polyols B);
c) 2 to 30 wt % of one or more polyether polyols C);
d) 0 to 40 wt % of one or more polyols D);
e) optionally one or more catalysts E);
f) optionally one or more further components F) selected from auxiliaries and adjuvants;
g) optionally one or more blowing agents G) selected from chemical blowing agents G1) and physical blowing agents G2);

where the concentration figures in wt % for A) to D) are based on the total amount of components A) to G1) of the polyol component P).

The invention likewise relates to a method for producing rigid polyurethane foams by reaction of
I) organic or modified organic di- or polyisocyanates PI) or mixtures thereof with
II) a polyol component P) of the invention.

The polyol component P) used for the reaction with the organic di- or polyisocyanates PI) preferably comprises at least one blowing agent selected from chemical blowing agents G1) and physical blowing agents G2). Likewise preferably, the polyol component P) used for the reaction with the di- or polyisocyanates PI) comprises one or more catalysts E), and very preferably the polyol component P) comprises at least one blowing agent G) selected from chemical blowing agents G1) and physical blowing agents G2), and at least one catalyst E).

Di- or Polyisocyanates PI)

Suitable organic di- or polyisocyanates PI) include the aliphatic, cycloaliphatic, araliphatic, and preferably the aromatic polyfunctional isocyanates that are known per se. The organic di- or polyisocyanates may optionally have been modified.

Specific examples would include the following: alkylene diisocyanates having 4 to 12 carbon atoms in the alkylene radical, such as 1,12-dodecane diisocyanate, 2-ethyltetramethylene 1,4-diisocyanate, 2-methylpentamethylene 1,5-diisocyanate, tetramethylene 1,4-diisocyanate, and preferably hexamethylene 1,6-diisocyanate; cycloaliphatic diisocyanates such as cyclohexane 1,3- and 1,4-diisocyanate, and also any desired mixtures of these isomers, 1-isocyanato-3,3,5-trimethyl-5-isocyanatomethylcyclohexane (IPDI), 2,4- and 2,6-hexahydro-tolylene diisocyanate and also the corresponding isomer mixtures, 4,4'-, 2,2'- and 2,4'-dicyclohexylmethane diisocyanate and also the corresponding isomer mixtures, and, preferably, aromatic di- and polyisocyanates, such as, for example, 2,4- and 2,6-tolylene diisocyanate and the corresponding isomer mixtures, 4,4'-, 2,4'- and 2,2'-diphenylmethane diisocyanate and the corresponding isomer mixtures, mixtures of 4,4'- and 2,2'-diphenylmethane diisocyanates, polyphenylpolymethylene polyisocyanates, mixtures of 4,4'-, 2,4'- and 2,2'-diphenylmethane diisocyanates and polyphenylpolymethylene polyisocyanates (crude MDI), and mixtures of crude MDI and tolylene diisocyanates. The organic di- or polyisocyanates can be used individually or in the form of their mixtures.

Preferred polyisocyanates are tolylene diisocyanate (TDI), diphenylmethane diisocyanate (MDI) and especially mixtures of diphenylmethane diisocyanate and polyphenylene polymethylene polyisocyanates (polymeric MDI or PMDI).

Use is frequently also made of modified polyfunctional isocyanates, i.e., products obtained by chemical reaction of organic polyisocyanates. By way of example, mention may be made of polyisocyanates containing ester, urea, biuret, allophanate, carbodiimide, isocyanurate, uretdione, carbamate and/or urethane groups.

The rigid polyurethane foams of the invention are produced very preferably using polymeric MDI, e.g., Lupranat® M20 from BASF SE.

To produce the rigid polyurethane foams of the invention, the optionally modified organic di- and/or polyisocyanates PI) and the polyol component P) of the invention comprising a blowing agent are reacted in amounts such that the isocyanate index is 70 to 300, preferably 90 to 200, more preferably 100 to 150.

The rigid polyurethane foams are produced advantageously by the one shot process, for example using high-pressure or low-pressure technology in open or closed molds, examples being metallic molds. Also customary is the continuous application of the reaction mixture to suitable belt lines in order to produce panels.

The starting components are mixed at a temperature of 10 to 30° C., preferably of 15 to 30° C. and more particularly of 15 to 25° C. and the mixture is introduced into the open mold or, optionally under elevated pressure, into the closed mold. Mixing takes place customarily in the high-pressure mixing head. The mold temperature is usefully 30 to 70° C., preferably 40 to 60° C.

The invention likewise relates to rigid polyurethane foam obtainable by the method of the invention.

The invention likewise relates to the use of the polyol component P) of the invention for producing rigid polyurethane foams.

The invention likewise relates to the use of the rigid polyurethane foam produced by the method of the invention for insulating and cooling applications, especially in refrigerators, commercial refrigeration equipment, freezer chests, pipe insulation, insulation boards, hot water storage systems and boilers and also in transport boxes.

All above-recited embodiments and preferred embodiments are preferably freely combinable with one another, unless the context unambiguously says otherwise.

The expressions "comprising" and "comprises" preferably also encompass the expressions "consisting", "consisting of" or "consists of".

The invention is elucidated in more detail by the examples below, without any limitation on the invention.

EXAMPLES

I. Methods of Measurement:
Measurement of Hydroxyl Number:
The hydroxyl numbers are determined in accordance with DIN 53240 (1971-12).
Viscosity Determination:
The viscosity of the polyols is determined, unless otherwise indicated, at 25° C. in accordance with DIN EN ISO 3219 (1994), using a Haake Viscotester 550 or a Brookfield CAP2000 with plate/cone measuring geometry (PK100) using the cone PK 1 1° (diameter: 28 mm; cone angle: 1°) at a shear rate of 40 1/s.
Determination of Demolding Behavior:
The demolding behavior is determined by measuring the post-expansion of foam bodies produced using a 700×400×90 mm box mold at a mold temperature of 45±2° C. depending on the demolding time and the degree of overpacking (OP, corresponding to the ratio of overall apparent density/minimum fill density, and describing the percentage extra amount of starting materials actually required in order just to fill the mold with a rigid PU foam. The experimental examples described herein were carried out with an OP of 17.5%). The post-expansion is determined by measuring the height of the foam cuboids after 24 h.
Start Time:
Time from the commencement of the mixing of the reaction mixture until the start of foam expansion.
Setting Time (Gel Time/Fiber Time)
The time from the commencement of the mixing of the reaction mixture up to the time until which fibers can be drawn in contact with the foam (using a wooden rod, for example). This point therefore represents the transition from the liquid to the solid state.
Minimum Fill Density for a Component Part/Free Rise Density:
Minimum fill density is determined by introducing an amount of polyurethane reaction mixture into a mold measuring 2000×200×50 mm at a mold temperature of 45±2° C. to just fill the mold with the foam without being in contact with the end of the mold. The length of the flow path is measured, and the minimum fill density is calculated according to MFD=(m*L/(V*s)), where m=mass, L=length of mold, s=flow path, and V=volume of mold. The free rise density is determined by foaming the polyurethane reaction mixture into a plastic bag at room temperature. The density is determined on a cube taken from the center of the foam-filled plastic bag.
Determination of Flowability:
The flowability is reported in terms of the flow factor= (minimum fill density/free rise density).
Adhesion:
A test body is taken from the specimen body. This test body corresponds to the first 50 cm, as considered starting from the sprue, of the lance molding, with an overpacking of 14.5%. Using a stencil, the aluminum foil on the top face is cut in to a width of 56 mm and a length of 200 mm, and a lug of approximately 50 mm is lifted from the foam. This lug is clamped into the sample holder of the universal testing machine. When the test time is reached, measurement is commenced. The measured force for peeling the aluminum foil from the foam is output in newtons (N). Adhesion values intended for comparison with other foam formulations must be measured under identical foaming and testing conditions. To test the limit of the adhesion of the covering foil on the foam, the mold temperature is lowered in steps of 5° C., specimens are foamed, and the adhesion is measured on these specimens. The adhesion limit is reached when the cover layer detaches from the foam already when the specimen is being demolded.
Thermal Conductivity:
The thermal conductivity is determined using a Taurus TCA300 DTX instrument at a midpoint temperature of 10° C. To produce the test specimens, the polyurethane reaction mixture is introduced into a mold measuring 2000×200×50 mm (15% overpacking) and demolded after 5 minutes. Following storage under standard conditions for 24 hours, a number of foam cuboids (at positions 10, 900 and 1700 mm, based on the start of the lance) with dimensions of 200× 200×50 mm are cut out of the center. The top and bottom sides are then removed, to give test specimens with dimensions of 200×200×30 mm.
II. Preparation of the Polyols:
Polyether Polyol A1) and A2):
A pressure reactor with stirrer, jacket heating and cooling, metering devices for solid and liquid substances and alkylene oxides and also devices for nitrogen inertization and a vacuum system was filled with glycerol, sucrose, solid imidazole and, for polyol A1), with a polyether polyol based on sucrose, glycerol and propylene oxide (with OH number of 490 mg KOH/g, functionality: 4.3). The reactor was then repeatedly inertized (with stirring) and the temperature was raised to 120° C. The mixture was reacted with propylene oxide at 120° C. The 2-hour after-reaction took place at 120° C. The sample was subsequently stripped off in a stream of nitrogen.
Example for Computing the Functionality from the Polyether Polyol A1)
12.3 kg of glycerol, 90.70 kg of sucrose, 0.34 kg of solid imidazole and 29.00 kg of the polyether polyol based on sucrose, glycerol and propylene oxide (molecular weight 488 g/mol, functionality 4.3) were reacted with 256.3 kg of propylene oxide to give 372 kg of product with the following parameters:
OH number: 429 mg KOH/g
Viscosity (25° C.): 34 600 mPas
Computation of Starter Functionality:
Glycerol (functionality 3): 12 300 g/92.09 g/mol=132.4 mol Sucrose (functionality 8): 90 700 g/342.3 g/mol=246.97 mol Imidazole (functionality 1): 340 g/68.08 g/mol=5.0 mol Polyether polyol (functionality 4.3): 29 000 g/488 g/mol=59.4 mol Starter functionality: (132.4 mol*3+246.97 mol*8+5.0 mol*1+59.4 mol*4.3)/(132.4 mol+246.97 mol+5.0 mol+59.40 mol)=6.0

Composition (Percent by Mass):

| | |
|---|---|
| Sucrose | 23.3% |
| Glycerol | 3.2% |
| Polyether polyol | 7.5% |
| Propylene oxide | 66.0% |

Polyether Polyol B1):

A pressure reactor with stirrer, jacket heating and cooling, metering devices for solid and liquid substances and alkylene oxides and also devices for nitrogen inertization and a vacuum system was heated to 80° C. and repeatedly inertized. The reactor was charged with vic-toluenediamine and the stirrer was put into operation. The reactor was then inertized again and the temperature was raised to 130° C., and propylene oxide was metered. After a 2-hour reaction period, the temperature was lowered to 100° C. and dimethylethanolamine was added. The intermediate was reacted with further propylene oxide. The after-reaction ran for 2 hours at 130° C. The sample was subsequently stripped off in a stream of nitrogen.

Polyether Polyols C1) and C2):

Polyetherol C1

A pressure reactor with stirrer, jacket heating and cooling, metering devices for solid and liquid substances and alkylene oxides and also devices for nitrogen inertization and a vacuum system was filled with 11.59 kg of glycerol and 1 kg of aqueous KOH (48% by mass). The reactor was then repeatedly inertized (with stirring), the temperature was raised to 120° C., and reduced pressure was applied (15 mbar) for 1 hour. Then 106.70 kg of propylene oxide were metered. In the next step, a mixture of 234.81 kg of propylene oxide and 46.76 kg of ethylene oxide was metered in. The after-reaction of 2 hours took place at 120° C. The sample was subsequently stripped off in a stream of nitrogen and worked up with Magnesol. This gave a product having the following parameters:

OH number: 56 mg KOH/g

Viscosity (25° C.): 480 mPas

Polyetherol C2

A pressure reactor with stirrer, jacket heating and cooling, metering devices for solid and liquid substances and alkylene oxides and also devices for nitrogen inertization and a vacuum system was filled with 9.19 kg of glycerol and 1 kg of aqueous KOH (48% by mass). The reactor was then repeatedly inertized (with stirring), the temperature was raised to 120° C., and reduced pressure was applied (15 mbar) for 1 hour. Then 337.31 kg of propylene oxide were metered. In the next step, 53.15 kg of ethylene oxide were metered in. The after-reaction of 2 hours took place at 120° C. The sample was subsequently stripped off in a stream of nitrogen and worked up with Magnesol. This gave a product having the following parameters:

OH number: 35 mg KOH/g

Viscosity (25° C.): 850 mPas

Polyether Polyol D1):

A pressure reactor with stirrer, jacket heating and cooling, metering devices for solid and liquid substances and alkylene oxides and also devices for nitrogen inertization and a vacuum system was heated to 80° C. and repeatedly inertized. Vicinal toluenediamine was added and the reactor was repeatedly inertized. The temperature was raised to 130° C. and the mixture at this temperature was admixed with a mixture of ethylene oxide and propylene oxide (EO:PO=1: 15). After a 2-hour reaction period, a 50% aqueous KOH solution (percent by mass) was added. This was followed by a reduced pressure phase of 1 hour, after which, at 130° C., a mixture of ethylene oxide and propylene oxide (EO:PO=1: 15) was metered in. After a 3-hour reaction period, the sample was stripped off in a stream of nitrogen.

III. Ingredients

Polyols A) to D) were prepared as described above.

Polyol A1): polyether polyol based on sucrose, glycerol and propylene oxide (PO) with OH number of 427 mg KOH/g; functionality: 6.0

Polyol A2): polyether polyol based on sucrose, glycerol and PO with OH number of 450 mg KOH/g; functionality: 5.0

Polyol 1): polyether polyol based on vic-TDA and PO with OH number of 399 mg KOH/g; functionality: 4.0

Polyol C1): polyether polyol based on glycerol, propylene oxide and ethylene oxide (EO), the alkylene oxide chains being composed of a PO and a terminal mixed PO/EO block, where the EO fraction in the polyether polyol is 11.7 wt %, based on the polyether polyol, and the EO fraction in the terminal PO/EO block is 16.6 wt %, based on the terminal block; OH number: 56 mg KOH/g; functionality: 3.0

Polyol C2): polyether polyol based on glycerol, propylene oxide and ethylene oxide, where the alkylene oxide chains are composed of a PO and an EO block, where the EO fraction in the polyether polyol is 13.3 wt %, based on the polyether polyol, and the EO fraction in the terminal EO block is 100 wt %, based on the terminal block; OH number: 35 mg KOH/g; functionality: 3.0

Polyol D1): polyether polyol based on vic-TDA, propylene oxide and ethylene oxide with OH number of 160 mg KOH/g; functionality: 4.0

Catalyst Mixture E) Consisting of:

Catalyst E1): dimethylcyclohexylamine

Catalyst E2): pentamethyldiethylenetriamine or bis(2-dimethylaminoethyl) ether

Catalyst E3): tris(dimethylaminopropyl)hexahydro-1,3,5-triazine

Catalyst E4): dimethylbenzylamine

Stabilizer F):

Silicone-containing foam stabilizer, Tegostab® B8474 and/or Tegostab® B8491 from Evonik Physical Blowing Agent G2)

Cyclopentane 95 (CP 95): cyclopentane with 95% purity

Furthermore, each polyol component was additionally admixed with 13.5 wt % of cyclopentane 95, based on the total weight of the polyol components A) to G1).

Isocyanate:

Polymeric MDI with an NCO content of 31.5 wt % (Lupranat® M20)

IV. Rigid PU Foams

The aforesaid ingredients were used to produce polyol components P) to which a physical blowing agent was added prior to foaming. A PU 30/80 IQ high-pressure Puromaten® (Elastogran GmbH) with an output rate of 250 g/s was used to mix the polyol components P), which had been admixed with the physical blowing agent, with the requisite amount of the specified isocyanate in each case, so as to obtain the desired isocyanate index.

The reaction mixture was injected into molds temperature-regulated to 40° C. with dimensions of 2000 mm×200 mm×50 mm or 400 mm×700 mm×90 mm, and allowed to foam up in the molds. Overpacking was 17.5%, i.e., 17.5% more reaction mixture was used than was needed to fully foam out the mold.

Table 1 shows the polyol components P used and the results of measurement for the rigid PU foams produced therefrom. From the results it is evident that rigid PU foams produced with polyol components P) of the invention exhibit an improved combination of advantageous properties in respect of demoldability (apparent in the tables from lower figures for post-expansion), heat insulation and, in particular, improved adhesion.

TABLE 1

| | Example 1 | Comparative 1 | Example 2 | Comparative 2 | Example 3 | Comparative 3 |
|---|---|---|---|---|---|---|
| Polyol component P | | | | | | |
| Polyol A1 | 50.2 | 50.7 | — | — | 41.2 | 45.2 |
| Polyol A2 | — | — | 47.8 | 47.8 | — | — |
| Polyol B1 | 30.0 | 30.0 | 35.0 | 35.0 | 41.2 | 45.2 |
| Polyol C1 | 10 | — | — | — | 8.0 | — |
| Polyol C2 | — | — | 3.00 | — | — | — |
| Polyol D1 | — | 9.3 | 5.00 | 8.0 | — | — |
| Propylene carbonate | 2.0 | 2.0 | 1.0 | 1.0 | 2.0 | 2.0 |
| Catalyst mixture E | 2.5 | 2.5 | 3.0 | 3.0 | 2.1 | 2.1 |
| Stabilizer F | 3.0 | 3.0 | 3.0 | 3.0 | 3.0 | 3.0 |
| Water | 2.3 | 2.5 | 2.2 | 2.2 | 2.5 | 2.5 |
| Total | 100 | 100 | 100 | 100 | 100 | 100 |
| Cyclopentane 95 | 13.5 | 13.5 | 13.5 | 13.5 | 13.5 | 13.5 |
| Isocyanate I | | | | | | |
| Isocyanate | 100 | 100 | 100 | 100 | 100 | 100 |
| NCO index | 120 | 120 | 120 | 120 | 120 | 120 |
| Machine data | | | | | | |
| Start time [s] | 4 | 4 | 5 | 6 | 5 | 4 |
| Setting time [s] | 41 | 39 | 45 | 42 | 40 | 38 |
| Free rise density [g/L] | 22.6 | 22.2 | 22.9 | 23.1 | 22.5 | 22.0 |
| Minimum fill density [g/L] | 30.3 | 30.0 | 31.9 | 30.8 | 30.3 | 30.8 |
| Thermal conductivity [mW/mK] | 20.0 | 19.8 | 19.8 | 19.9 | 19.5 | 19.7 |
| Adhesion (45° C. mold temperature) [N] | 8.5 | 5.0 | 7.0 | 6.3 | 4.5 | 3.0 |
| Adhesion (40° C. mold temperature) [N] | 8.0 | 4.1 | 6.7 | 5.1 | 2.8 | 1.1 |
| Post-expansion (determined by a 90 mm box mold with overpacking of 17.5%) | | | | | | |
| 3 min | 3.7 | 3.9 | 3.1 | 3.4 | 2.7 | 2.7 |
| 4 min | 2.0 | 2.3 | 1.8 | 2.0 | 1.5 | 1.6 |
| 5 min | n.d. | n.d. | 0.7 | 0.9 | 0.6 | 0.5 |

What is claimed is:

1. A polyol component P), comprising:
   a) 37 to 55 wt %, based on total weight of the polyol component P), of one or more polyether polyols A) having an OH number in the range from 300 to 520 mg KOH/g, and a functionality in the range from 4.6 to 6.5, selected from the group consisting of reaction products of monosaccharides, oligosaccharides, polysaccharides, polyhydric alcohols, alkoxylation products of the aforesaid compounds, or mixtures thereof with alkylene oxides;
   b) one or more polyether polyols B) with an OH number in the range from 320 to 500 mg KOH/g, selected from the group consisting of reaction products of aromatic diamines with alkylene oxides;
   c) one or more polyether polyols C) having an OH number in the range from 15 to 75 mg KOH/g, selected from the group consisting of reaction products of monosaccharides, oligosaccharides, polysaccharides, polyhydric alcohols, water or mixtures thereof with alkylene oxides comprising ethylene oxide;
   wherein the one or more polyether polyols C) comprises 10 to 35 wt % of units derived from ethylene oxide units based on a total weight of the one or more polyether polyols C);
   d) optionally, one or more polyols D) which are different from the one or more polyether polyols A), B) and C);
   e) optionally, one or more catalysts E);
   f) optionally, one or more further components F) selected from the group consisting of auxiliaries and adjuvants; and
   g) optionally, one or more blowing agents selected from the group consisting of chemical blowing agents G1) and physical blowing agents G2).

2. The polyol component P) according to claim 1, wherein the one or more polyether polyols B) has a functionality in the range from 3.0 to 4.0.

3. The polyol component P) according to claim 1, wherein the one or more polyether polyols B) is selected from the group consisting of reaction products of 2,3-, 3,4-, 2,4-, 2,5-, and/or 2,6-tolylenediamine or mixtures thereof with $C_2$-$C_4$ alkylene oxides.

4. The polyol component P) according to claim 1, wherein the one or more polyether polyols C) has a functionality in the range from 2.3 to 5.5.

5. The polyol component P) according to claim 1, wherein the one or more polyether polyols C) has a functionality in the range from 2.5 to 4.5.

6. The polyol component P) according to claim 1, wherein the one or more polyether polyols C) has a functionality in the range from 2.3 to 5.5, and wherein the one or more polyether polyols B) has an OH number in the range from 380 to 450 mg KOH/g.

7. The polyol component P) according to claim 1, wherein the one or more polyether polyols C) has a functionality in the range from 2.3 to 5.5 and is selected from the group consisting of reaction products of monosaccharides, oligosaccharides, polysaccharides, polyhydric alcohols, water or mixtures thereof with ethylene oxide and propylene oxide.

8. The polyol component P) according to claim 1, wherein the one or more polyether polyols C) is selected from the group consisting of reaction products of monosaccharides, oligosaccharides, polysaccharides, polyhydric alcohols or mixtures thereof with ethylene oxide and propylene oxide.

9. The polyol component P) according to claim 1, wherein the one or more polyether polyols C) is selected from the group consisting of reaction products of glycerol, trimethylolpropane, ethylene glycol, diethylene glycol, triethylene glycol, propylene glycol, dipropylene glycol, pentaerythritol, sorbitol, sucrose, water or mixtures thereof with $C_2$-$C_4$ alkylene oxides including ethylene oxide.

10. The polyol component P) according to claim 1, wherein the one or more polyether polyols C) comprises 11 to 18 wt % of ethylene oxide units, based on a total weight of the one or more polyether polyols C).

11. The polyol component P) according to claim 1, wherein the one or more polyether polyols C) has the following structure:

wherein S is selected from the group consisting of monosaccharides, oligosaccharides, polysaccharides, water, and polyhydric alcohols, n is 2 to 10, and B in each case, independently of one another at each occurrence, is a chain composed of ethylene oxide and propylene oxide units, wherein the ethylene oxide and the propylene oxide units form pure ethylene oxide blocks, pure propylene oxide blocks and/or mixed blocks of ethylene oxide and propylene oxide, and wherein the chain includes a terminal block which comprises 10 to 100 wt % of ethylene oxide units, based on the total weight of the terminal block.

12. The polyol component P) according to claim 1, wherein a concentration of the one or more polyether polyols C) is at least 2 wt %, based on the total amount of components A) to G1) of the polyol component P).

13. The polyol component P) according to claim 1, comprising:
   a) 37 to 55% of the one or more polyether polyols A);
   b) 5 to 50 wt % of the one or more polyether polyols B);
   c) 2 to 30 wt % of the one or more polyether polyols C);
   d) 0 to 40 wt % of the one or more polyols D);
   e) optionally, the one or more catalysts E);
   f) optionally, the one or more further components F) selected from the group consisting of auxiliaries and adjuvants; and
   g) optionally, the one or more blowing agents selected from the group consisting of chemical blowing agents G1) and physical blowing agents G2);
   wherein the amounts in wt % for components A) to D) are based on the total amount of components A) to G1) of the polyol component P).

14. The polyol component P) according to claim 1, wherein the polyol component P) comprises at least one further polyol D) selected from the group consisting of polyether polyols D1) having an OH number in the range from 100 to 240 mg KOH/g, wherein the polyether polyols D1) are selected from the group consisting of reaction products of amines, polyhydric alcohols or mixtures thereof with alkylene oxides.

15. The polyol component P) according to claim 1, wherein the polyol component P) comprises at least one further polyol D1) selected from the group consisting of polyether polyols having an OH number in the range from 100 to 240 mg KOH/g, and
   wherein the at least one further polyol D1) is selected from the group consisting of reaction products of amines, polyhydric alcohols or mixtures thereof with alkylene oxides,
   wherein a total concentration of the one or more polyether polyols C) and the at least one further polyol D1) is at least 5 wt %, based on the total amount of components A) to G1) of the polyol component P).

16. A method for producing a rigid polyurethane foam, the method comprising:
   reacting
   I) di- or polyisocyanates PI) or a mixture thereof, with
   II) the polyol component P) according to claim 1.

17. A rigid polyurethane foam obtainable by the method according to claim 16.

18. A method, comprising:
   reacting the polyol component P) according to claim 1 with a polyisocyanate, to produce a rigid polyurethane foam.

19. A method, comprising:
   producing a rigid polyurethane foam according to the method of claim 16 for an insulating or cooling application.

20. The polyol component P) according to claim 13, wherein the one or more polyether polyols B) is selected from the group consisting of reaction products of 2,3-, 3,4-, 2,4-, 2,5-, and/or 2,6-tolylenediamine or mixtures thereof with $C_2$-$C_4$ alkylene oxides and wherein the one or more polyether polyols C) has a functionality in the range from 2.3 to 5.5 and is selected from the group consisting of reaction products of monosaccharides, oligosaccharides, polysaccharides, polyhydric alcohols, water or mixtures thereof with ethylene oxide and propylene oxide, and wherein components e), f), and g) are present.

* * * * *